US009800685B2

(12) United States Patent
Neerincx et al.

(10) Patent No.: US 9,800,685 B2
(45) Date of Patent: Oct. 24, 2017

(54) AUTOMATIC DATA REQUEST RECOVERY AFTER SESSION FAILURE

(71) Applicant: Microsoft Technology Licensing, LLC, Redmond, WA (US)

(72) Inventors: Matthew Alban Neerincx, Sammamish, WA (US); Luiz Fernando Federico Dos Santos, Lynnwood, WA (US); Oleg Ignat, Bellevue, WA (US); David Bruce Lomet, Redmond, WA (US); Quetzalcoatl Bradley, Monroe, WA (US); Raghu Ram, Redmond, WA (US); Chadwin James Mumford, Woodinville, WA (US); Peter Gvozdjak, Bellevue, WA (US); Balendran Mugundan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/977,230

(22) Filed: Dec. 21, 2015

(65) Prior Publication Data

US 2016/0191662 A1    Jun. 30, 2016

Related U.S. Application Data

(63) Continuation of application No. 13/559,337, filed on Jul. 26, 2012, now Pat. No. 9,251,194.

(51) Int. Cl.
*G06F 11/00* (2006.01)
*H04L 29/08* (2006.01)
(Continued)

(52) U.S. Cl.
CPC .......... *H04L 67/32* (2013.01); *G06F 11/1402* (2013.01); *G06F 17/30348* (2013.01);
(Continued)

(58) Field of Classification Search
CPC .. G06F 11/2023; G06F 11/006; G06F 11/182; G06F 11/2028; G06F 11/2041;
(Continued)

(56) References Cited

U.S. PATENT DOCUMENTS 5,826,085 A    10/1998 Bennett et al.
5,951,694 A    9/1999 Choquier et al.
(Continued)

FOREIGN PATENT DOCUMENTS

EP    0554854 A2    8/1993

OTHER PUBLICATIONS

"Non-Final Office Action Issued in U.S. Appl. No. 13/559,337", Mailed Date: May 21, 2015, 17 Pages.
(Continued)

*Primary Examiner* — Jason Bryan
(74) *Attorney, Agent, or Firm* — Fiala & Weaver P.L.L.C.

(57) ABSTRACT

Techniques for recovering from session failures between clients and database servers are described herein. A first session may be established between a client and a first database server to handle a database query for the client. A request for data associated with the first session may be received by the first database server from the client, and the data retrieved. Prior to responding to the request, the data is spooled to a first session state stored in a repository made accessible by at least one computing device. The computing device(s) controls access to session states in the repository that correspond to sessions between clients and database servers. The computing device(s) enables sessions to be reestablished between the clients and database servers by accessing data of the session states in the repository and transmitting the data in response to messages received from the database servers containing session identifiers.

20 Claims, 10 Drawing Sheets

(51) Int. Cl.
*G06F 17/30* (2006.01)
*H04L 29/14* (2006.01)
*G06F 11/14* (2006.01)

(52) U.S. Cl.
CPC ...... *G06F 17/30864* (2013.01); *H04L 67/142* (2013.01); *H04L 69/40* (2013.01); *G06F 2201/80* (2013.01)

(58) Field of Classification Search
CPC ........ G06F 15/177; G06F 3/065; G06F 3/067; G06F 11/1451; G06F 11/1471; G06F 11/1666; G06F 11/202; G06F 11/2043; G06F 11/2097; G06F 11/1402; H04L 67/32; H04L 69/40; H04L 67/142
See application file for complete search history.

(56) References Cited

U.S. PATENT DOCUMENTS

| | | | |
|---|---|---|---|
| 5,960,436 A | 9/1999 | Chang et al. | |
| 6,182,086 B1* | 1/2001 | Lomet | G06F 11/1471 |
| 6,199,110 B1* | 3/2001 | Rizvi | G06F 17/30348 707/999.01 |
| 6,314,455 B1 | 11/2001 | Cromer et al. | |
| 6,321,298 B1* | 11/2001 | Hubis | G06F 11/2089 711/113 |
| 6,381,617 B1 | 4/2002 | Frolund et al. | |
| 6,453,354 B1 | 9/2002 | Jiang et al. | |
| 6,463,459 B1 | 10/2002 | Orr et al. | |
| 6,539,494 B1 | 3/2003 | Abramson et al. | |
| 6,704,778 B1 | 3/2004 | Horman | |
| 6,778,653 B1 | 8/2004 | Kallas et al. | |
| 6,801,914 B2 | 10/2004 | Barga et al. | |
| 6,820,085 B2 | 11/2004 | Nishizawa et al. | |
| 7,231,636 B1 | 6/2007 | Evans | |
| 7,284,155 B2 | 10/2007 | Faihe et al. | |
| 7,343,515 B1 | 3/2008 | Gilbertson et al. | |
| 7,657,782 B2 | 2/2010 | Das et al. | |
| 7,664,879 B2 | 2/2010 | Chan et al. | |
| 7,693,999 B2 | 4/2010 | Park | |
| 7,702,947 B2 | 4/2010 | Peddada | |
| 7,716,274 B1 | 5/2010 | Kumar | |
| 7,765,256 B2 | 7/2010 | Doshi et al. | |
| 7,853,926 B2 | 12/2010 | Blouin et al. | |
| 7,882,173 B2 | 2/2011 | Hirsch et al. | |
| 7,953,883 B2 | 5/2011 | Thomas et al. | |
| 8,051,180 B2 | 11/2011 | Mazzaferri et al. | |
| 8,103,779 B2 | 1/2012 | Belkin et al. | |
| 9,251,194 B2 | 2/2016 | Neerincx et al. | |
| 2002/0111949 A1 | 8/2002 | Barga et al. | |
| 2002/0152430 A1 | 10/2002 | Akasaka et al. | |
| 2003/0084165 A1 | 5/2003 | Kjellberg et al. | |
| 2003/0145103 A1 | 7/2003 | Pruyne et al. | |
| 2004/0044865 A1 | 3/2004 | Sicola et al. | |
| 2004/0249948 A1 | 12/2004 | Sethi et al. | |
| 2005/0193245 A1 | 9/2005 | Hayden et al. | |
| 2005/0240558 A1 | 10/2005 | Gil et al. | |
| 2006/0075112 A1 | 4/2006 | Polozoff | |
| 2006/0123098 A1 | 6/2006 | Asher et al. | |
| 2006/0242286 A1 | 10/2006 | Hawkins et al. | |
| 2006/0277596 A1 | 12/2006 | Calvert et al. | |
| 2007/0174493 A1 | 7/2007 | Irish et al. | |
| 2007/0208862 A1 | 9/2007 | Fox et al. | |
| 2008/0010500 A1* | 1/2008 | Shimmitsu | G06F 11/1662 714/6.32 |
| 2008/0033964 A1 | 2/2008 | Richards et al. | |
| 2008/0062863 A1 | 3/2008 | Ginde | |
| 2008/0126831 A1 | 5/2008 | Downey et al. | |
| 2008/0134138 A1 | 6/2008 | Chamieh et al. | |
| 2008/0229023 A1 | 9/2008 | Plamondon | |
| 2008/0301418 A1 | 12/2008 | Khailany et al. | |
| 2009/0083088 A1 | 3/2009 | Mathew et al. | |
| 2009/0113457 A1 | 4/2009 | Sedukhin et al. | |
| 2010/0049785 A1* | 2/2010 | Stoyanov | H04L 1/1607 709/203 |
| 2010/0064130 A1 | 3/2010 | Borisov | |
| 2010/0138672 A1* | 6/2010 | Horie | G06F 3/0623 713/193 |
| 2010/0153702 A1 | 6/2010 | Loveless | |
| 2010/0205583 A1 | 8/2010 | Gebhardt et al. | |
| 2011/0055839 A1 | 3/2011 | Alexander et al. | |
| 2011/0060622 A1 | 3/2011 | Piersol et al. | |
| 2011/0113247 A1 | 5/2011 | Panasyuk et al. | |
| 2011/0213821 A1 | 9/2011 | Gentile et al. | |
| 2012/0102135 A1* | 4/2012 | Srinivasan | G06F 9/45558 709/213 |
| 2012/0197925 A1 | 8/2012 | Balagopalan et al. | |
| 2013/0066949 A1 | 3/2013 | Colrain et al. | |
| 2013/0311525 A1 | 11/2013 | Neerincx et al. | |
| 2013/0339533 A1 | 12/2013 | Neerincx et al. | |
| 2014/0032491 A1 | 1/2014 | Neerincx et al. | |

OTHER PUBLICATIONS

"Non-Final Office Action Issued in U.S. Appl. No. 13/559,337", Mailed Date: Nov. 7, 2014, 17 Pages.

"Notice of Allowance Issued in U.S. Appl. No. 13/559,337", Mailed Date: Oct. 26, 2015, 5 Pages.

"Notice of Allowance Issued in U.S. Appl. No. 13/559,337", Mailed Date: Sep. 25, 2015, 7 Pages.

"Oracle® Application Server Containers for J2EE Services Guide 1 Og Release 2 (10.1.2) for Windows or UNIX", Retrieved on: Dec. 22, 2011, Available at: http://docs.oracle.com/cd/B14099_19/web.1012/b14012/datasrc.htm, 23 pages.

Balman, et al., "Early Error Detection and Classification in Data Transfer Scheduling", In International Conference on Complex, Intelligent and Software Intensive Systems, Mar. 16, 2009, pp. 457-462.

U.S. Appl. No. 13/086,959, filed Apr. 14, 2011, 35 Pages.

Wilbur, et al., "Building Distributed Systems with Remote Procedure Call", In Software Engineering Journal, Sep. 1987, pp. 148-159.

International Search Report & Written Opinion for PCT Patent Application No. PCT/US2013/052152, Mailed Date: Oct. 9, 2013, filed Date: Jul. 26, 2013, 9 Pages.

Barga, et al., "Measuring and Optimizing a System for Persistent Database Sessions", In 17th International Conference on Data Engineering, Apr. 6, 2001, pp. 21-30.

Non-final Office Action Issued in U.S. Appl. No. 13/560,468, Mailed Date: Nov. 8, 2013, filed Date: Jul. 27, 2012, 7 Pages.

Notice of Allowance Issued in U.S. Appl. No. 13/560,468, Mailed Date: Mar. 6, 2014, filed Date: Jul. 27, 2012, 8 Pages Non-final Office Action Issued in U.S. Appl. No. 13/471,670, Mailed Date: Dec. 18, 2013, filed Date: May 15, 2012, 18 Pages.

Non-final Office Action Issued in U.S. Appl. No. 13/527,384, Mailed Date: Jan. 17, 2014, filed Date: Jun. 19, 2012, 19 Pages.

U.S. Appl. No. 13/653,318, filed Oct. 16, 2012, 36 Pages.

Barga, et al., "Persistent Client-Server Database Sessions", In Proceedings of the 7th International Conference on Extending Database Technology: Advances in Database Technology, Feb. 2000, 15 Pages.

Roehm, et al., "WebSphere Application Server V6 Scalability and Performance Handbook", In IBM Redbooks, May 26, 2005, 369 Pages.

International Search Report and Written Opinion received for PCT Patent Application No. PCT/US2013/051751, mailed on Oct. 8, 2013, 11 Pages.

Sultan, et al., "Recovering Internet Service Sessions from Operating System Failures", Retrieved at <<http://ieeexplore.ieee.org/stamp/stamp.jsp?tp=&arnumber=1405970>>, Proceedings: IEEE Internet Computing, 9(2), Mar. 2005, pp. 17-27.

Lomet, et al., "Efficient Transparent Application Recovery in Client-Server Information Systems", Retrieved at <<http://research.microsoft.com/pubs/68330/p460-lomet.pdf>>, Proceedings: ACM SIGMOD Conference, Jun. 2-4, 1998, pp. 460-471.

"Idempotent Command Execution", U.S. Appl. No. 13/471,670, filed May 15, 2012, pp. 47.

(56) References Cited

OTHER PUBLICATIONS

"Virtual Session Management and Reestablishment", U.S. Appl. No. 13/527,384, filed Jun. 19, 2012, pp. 44.
International Preliminary Report on Patentability received for PCT Patent Application No. PCT/US2013/051751, dated Jan. 27, 2015, 7 pages.

* cited by examiner

AUTOMATIC DATA REQUEST RECOVERY AFTER SESSION FAILURE

CROSS-REFERENCE TO RELATED APPLICATIONS

This application is a continuation of U.S. application Ser. No. 13/559,337, filed Jul. 26, 2012, entitled "Automatic Data Request Recovery After Session Failure," now allowed, which is incorporated by reference in its entirety herein.

BACKGROUND

A database server is a product that provides database services to computer applications in response to requests received therefrom. Such database services may include but are not limited to storing, retrieving, analyzing or manipulating database data. Depending upon the implementation, the applications may be running on the same machine on which the database server is running or may be running on other machines that are connected to the machine on which the database server is running via one or more networks. To send requests to the database server, an application connects to the database server and establishes therewith what is referred to as a session. A session represents an ongoing interactive information exchange between the application and the database server. A session is set up or established at a certain point in time and then torn down at a later point in time. An established session often involves the sending of more than one message from the application to the database server and from the database server to the application.

After an application has initiated a session with a database server, it may send a command to the database server for execution within the context of the session. For example, a command may be sent to the database server to retrieve rows from a database table. At some point in time, the connection that was established between the application and the database server may fail. For example, in a scenario in which the application and the database server are running on different machines, the connection may fail if the machine on which the database server is running is shut down or crashes or if there is a problem with a network that connects the different machines. If the connection fails, the session itself fails, and a command currently being processed by the database server fails. This results in the application having to implement retry logic to reattempt the command. However, retry logic is complex to implement in an application. Furthermore, when such an application is moved to a cloud environment, the application will need additional modifications to handle the more frequent database access failures that occur on lower cost commodity hardware.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for recovering from session failures between clients and database servers. A first session may be established between a client and a first database server to handle a database query for the client. A request for data associated with the first session may be received by the first database server from the client. The requested data may be retrieved. Prior to responding to the request, the data is spooled to a first session state stored in a repository that is accessible to the database servers by communications with at least one computing device. The at least one computing device controls access to session states in the repository, including the first session state, where the session states correspond to sessions between clients and database servers. The at least one computing device enables sessions to be reestablished between the clients and database servers by accessing data of the session states in the repository and transmitting the data in response to messages received from the database servers, where the messages contain session identifiers received from the database servers.

Computer program products containing computer readable storage media are also described herein that store computer code/instructions for enabling recovery from session failures, and enabling completion of commands that were in process during a session failure, as well as enabling additional embodiments described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
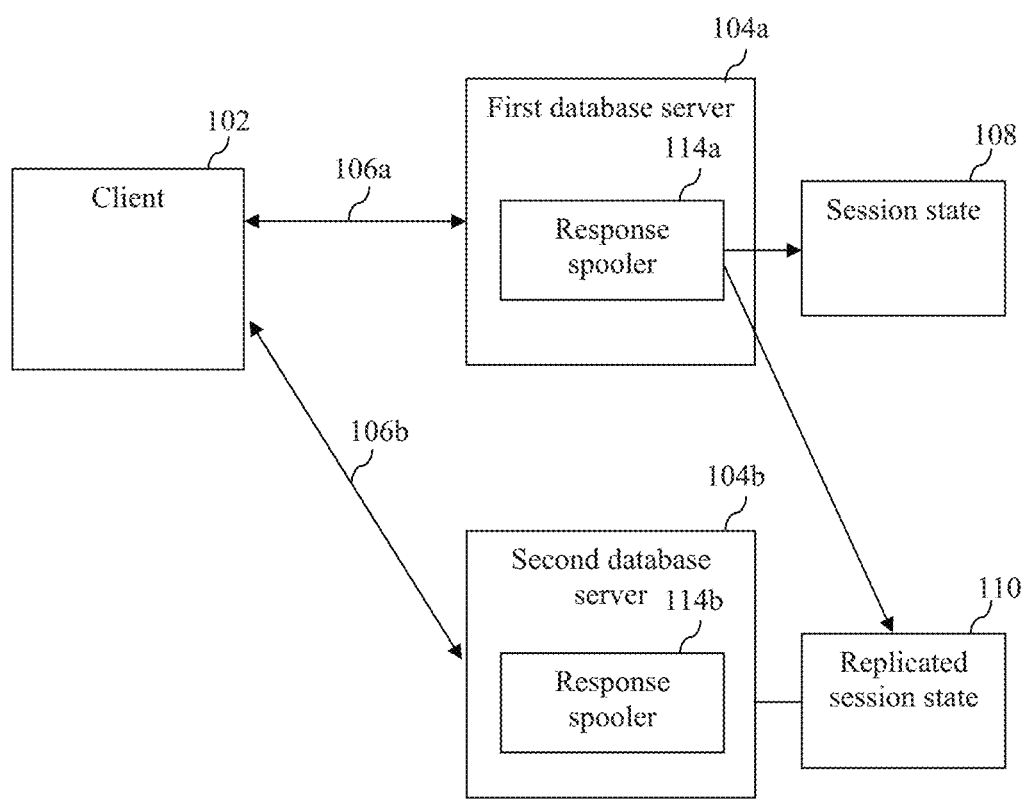
FIG. 1 is a block diagram of an example system that enables query completion in the event of a session failure between a client and a database server, according to an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Embodiments described herein facilitate recovery from session failures between a client and a database server, and enable the efficient completion of commands that were in process during such failed sessions. Section II describes example embodiments for conducting database queries in a manner that enables recovery from session failures. Section III describes example embodiments in which a client and a first database server recover from a session failure. Section IV describes example embodiments in which a session failure between the first database server and the client is recovered between the client and a second database server. Section V describes an example processor-based computer system that may be used to implement various embodiments described herein. Finally, Section VI provides some concluding remarks.

Although the embodiments described herein are implemented in systems that include database servers, persons skilled in the relevant art(s) will readily appreciate that the concepts described herein can easily be extended to any system in which sessions are established between a first entity to a second entity for execution of data requests, and wherein recovery from session failures is desired. Such systems may include but are not limited to any of a wide variety of client-server systems, peer-to-peer systems, or the like.

Numerous exemplary embodiments of the present invention are described as follows. It is noted that any section/subsection headings provided herein are not intended to be limiting. Embodiments are described throughout this document, and any type of embodiment may be included under any section/subsection.

II. Example Embodiments for Conducting a Session Between a Client and a Database Server in a Manner that Enables Recovery FIG. 1 is a block diagram of an example system 100 that facilitates recovery from session failures in accordance with one embodiment. System 100 is described herein by way of illustration only and is not intended to be limiting. Persons skilled in the relevant art(s) will appreciate that embodiments described herein may be implemented in systems other than system 100.

As shown in FIG. 1, system 100 includes a client 102 that is communicatively connected to a first database server 104a via a communication channel 106a, and is communicatively connected to a second database server 104b via a communication channel 106b. Database servers 104a and 104b are intended to represent entities that perform operations with respect to data stored in one or more databases that are accessible thereto in response to receiving commands generated by clients, such as client 102, via communication channels 106a and 106b. The operations performed by each of database servers 104a and 104b may include, for example, storing, retrieving, analyzing and/or manipulating database data. Database servers 104a and 104b may each be implemented as computer programs executing on a single machine or across multiple machines. As will be appreciated by persons skilled in the relevant art(s), such machines may comprise physical machines or virtual machines. In one embodiment, database servers 104a and 104b may each be an instance of MICROSOFT SQL SERVER®, published by Microsoft Corporation of Redmond Wash. However, this is an example only and is not intended to be limiting.

In one embodiment, database servers 104a and 104b each comprise a standalone database server configured to execute commands received from one or more clients, such as client 102. In an alternate embodiment, database server 104a and 104b may be included in a plurality of database server instances running on a cluster of machines and employed to service requests from a plurality of clients, such as client 102, in a manner that allows for failover and high availability. In a further embodiment, database servers 104a and 104b may each comprise one of a plurality of database server instances used to implement a cloud database service, such as but not limited to MICROSOFT WINDOWS AZURE SQL™ (hereinafter "SQL Database"), offered by Microsoft Corporation of Redmond, Wash. In embodiments, any number of database servers similar to database servers 104a and 104*b* may be present, including tens, hundreds, and even greater numbers of database servers.

Client 102 is intended to represent an entity that generates and sends commands to database servers 104*a* and 104*b* for execution thereby. Such commands may include, for example, commands to store, retrieve, analyze, and/or manipulate database data. Client 102 may be implemented as one or more computer programs executing on one or more machines. For instance, client 102 may be implemented in any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a mobile phone (e.g., a cell phone, a smart phone such as an Apple iPhone, a Google Android™ phone, a Microsoft Windows® phone, etc.), or other type of stationary or mobile device Client 102 and database servers 104*a* and 104*b* may each be executed by different machines that are connected to each other via a particular communication infrastructure. In further accordance with such an implementation, communication channels 106*a* and 106*b* may be established in a manner that corresponds to the particular communication infrastructure. For example, in an embodiment in which the communication infrastructure comprises a network, such as a local area network (LAN), a wide area network (WAN) or a combination of networks such as the Internet, well-known networking protocols may be used to establish communication channels 106*a* and 106*b* between the client 102 and database servers 104*a* and 104*b*. As another example, in an embodiment in which database servers 104*a* and 104*b* are included in a cloud database service, communication channels 106*a* and 106*b* may be established via a gateway machine that acts as an intermediary between the machine on which client 102 is running and the machines on which database servers 104*a* and 104*b* are running. Such gateway device, when present, may enable communications between client 102 and one of database servers 104*a* and 104*b* at a particular time. Still other communication infrastructures and associated methods for establishing communication channels 106*a* and 106*b* are possible.

It is also possible that client 102 and one or both of database servers 104*a* and 104*b* may be executing on the same machine. In accordance with such an implementation, one or both of communication channels 106*a* and 106*b* may comprise a channel that is internal to the machine upon which both entities are executing.

Generally speaking, communication channel 106*a* and 106*b* are used to transport commands generated by client 102 to database servers 104*a* and 104*b*, respectively, so that database servers 104*a* and 104*b* may execute such commands. Database servers 104*a* and 104*b* may also return requested data, error messages, or other information to client 102 via communication channels 106*a* and 106*b*. In accordance with certain embodiments, the manner in which information is exchanged between client 102 and database servers 104*a* and 104*b* is governed by a standard application layer protocol that is supported by both entities. For example, in a particular embodiment, the application layer protocol comprises the Tabular Data Stream (MS-TDS) protocol, as defined in Version 20120328 of the Tabular Data Stream Protocol Specification, published by Microsoft Corporation of Redmond, Wash. However, this is only an example, and other protocols may be used.

In accordance with certain embodiments, to interact with database servers 104*a* and 104*b* for the purpose of invoking the database services thereof, client 102 connects to one of database servers 104*a* or 104*b* and establishes therewith what is referred to herein as a session. For instance, client 102 may connect with database server 104*a* to establish a session. The session represents an ongoing interactive information exchange between client 102 and database server 104*a*. A session may be set up or established at a certain point in time and then ended at a later point in time. During an established session, client 102 may send database server 104*a* any number of commands and database server 104*a* may return to client 102 results, error codes or other information in response to executing or attempting to execute such commands (client 102 may alternatively interact with database server 104*b* in a similar manner when a session is established between them). For instance, client 102 may transmit an SQL (structured query language) command to database server 104*a*, such as a SELECT query or other command. A SELECT query may be used to retrieve data (e.g., one or more rows and/or columns) from one or more database tables managed by a databases server.

As shown in FIG. 1, database server 104*a* includes a response spooler 114*a*, and database server 104*b* includes a response spooler 114*b*. Response spoolers 114*a* and 114*b* function similarly for their respective database servers. Furthermore, additional database servers may be present that also include respective response spoolers similar to response spoolers 114*a* and 114*b*. For purposes of brevity, response spooler 114*a* is described as follows, and this description is intended to be representative of the functionality of response spooler 114*b* (and of further response spoolers that may be present in other database servers).

Response spooler 114*a* is configured to generate a session state 108. Session state 108 contains information representing a state of the session between database server 104*a* and client 102 at any particular time. As such, session state 108 may be used to recover from a session failure between client 102 and database server 104*a*. Session state 108 may include various types of state information. For instance, response spooler 114*a* may store a session identifier (e.g., a virtual session identifier) for the established session between client 102 and database server 104*a* in session state 108. Furthermore, a command identifier associated with each session command generated by client 102 and received by database server 104*a* may be stored in session state 108 by response spooler 114*a*. Database server 104*a* may retrieve data requested in the received command from a database associated with database server 104*a*, and response spooler 114*a* may include the retrieved data in session state 108. After response spooler 114*a* generates session state 108 with respect to a particular received command (and replicates session state 108, as further described below), database server 104*a* may transmit the retrieved data to client 102 in response to the received command.

The foregoing operations of response spooler 114*a* enable response spooler 114*a* to aid database server 104*a* (or other database server, such as database server 104*b*) in recovering from a session failure between client 102 and database 104*a*. For instance, if a session failure occurs between client 102 and database server 104*a* (e.g., due to a connection failure, a failure in database server 104*a*, etc.) resulting in a command that is being processed not being responded to, client 102 may retransmit the command with the command identifier and an identifier for the failed session to database server 104*a*. Database server 104*a* may compare the received command identifier and session identifier with session state 108, and if there is a match, may transmit the data included in session state 108 to client 102 in response to the command retransmission. The failed session may be reestablished in this manner, and continued between client 102 and database server 104a from the point of the failure.

Alternatively, as described herein, another database server, such as database server 104b, may be provided with a copy of session state 108 by response spooler 114a, shown as replicated session state 110. If a session failure occurs between client 102 and database server 104a resulting in a command that is being processed not being responded to, client 102 may retransmit the command with the command identifier and an identifier for the failed session. The retransmitted command may be received by database server 104b rather than database server 104a. This may be because database server 104a is not operating due to a system crash or other reason. Database server 104b may compare the received command identifier and session identifier with those stored in replicated session state 110, and if there is a match, may transmit the data included in replicated session state 110 to client 102 in response to the command retransmission. The failed session may be reestablished between client 102 and database server 104b in this manner (rather than database server 104a), and continued between client 102 and database server 104b from the point of the failure.

More information regarding the structure, function and operation of the components of system 100 in accordance with various implementations is described as follows in regard to FIGS. 2-11.

Figure 2:
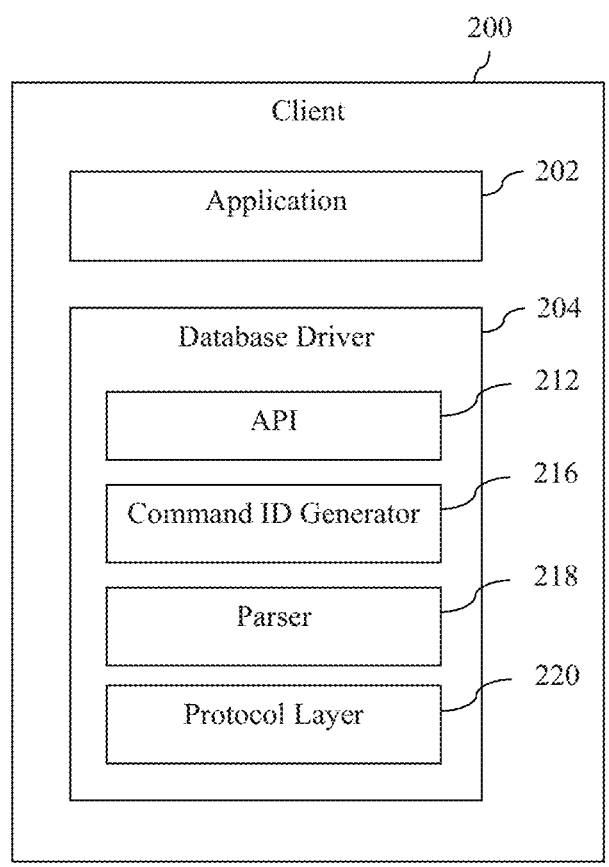
FIG. 2 is a block diagram of the client shown in FIG. 1, according to an example embodiment.

In particular, FIG. 2 is a block diagram that illustrates various elements of a client 200 in accordance with one example embodiment. Client 200 is an example of client 102 shown in FIG. 1. As shown in FIG. 2, client 200 comprises an application 202 and a database driver 204. Application 202 comprises a computer program that enables a user thereof to perform various functions, at least some of which require database operations to be performed. In order to facilitate the performance of such database operations, application 202 is programmed to interact with database driver 204. In an embodiment, application 202 may be considered to be included in client 200 (as shown in FIG. 2) or may be separate from client 200. For instance, in one embodiment, application 202 and client 200 may operate on a common computing device, and application 202 may access client 200 to communicate with a database at a database server. Application 202 may be any type of application that accesses data stored in a database (e.g., using SQL queries or other types of database requests provided to database driver 204). Database driver 204 operates to establish a connection between application 202 or any of a variety of other applications and a database server and to utilize such connection for the purpose of obtaining services from the database server.

In one embodiment, database driver 204 provides an application programming interface (API) 212 that can be used by any of a variety of applications to invoke the functionality thereof. As further shown in FIG. 2, database driver 204 also includes a command ID generator 216, a parser 218, and a protocol layer 220.

Command ID generator 216 is configured to generate an ID for each command that is generated by client 200 for transmission to and execution by a database server within the scope of a session. In one embodiment, command ID generator 216 generates a unique ID for each command so generated. When client 200 sends a command to a database server, client 200 also sends the command ID associated with that command to the database server. For example, in one embodiment, a command and its corresponding command ID are included within the same message that is transmitted from client 200 to a database server.

Parser 218 is configured to encode commands to be sent to a database server and to interpret information received therefrom in accordance with a particular application layer protocol, such as but not limited to MS-TDS. In one embodiment, protocol layer 220 is intended to represent one or more computer programs executing in hardware (e.g., one or more processors) utilized by database driver 204 to carry encoded commands produced by parser 218 to a database server and to receive encoded information therefrom.

In accordance with the embodiment shown in FIG. 2, the functions performed command ID generator 216 are performed at the level of database driver 204 rather than at the level of application 202. This is advantageous in that it can relieve programmers of applications that are designed to invoke database driver 204, such as application 202, from having to program features into their applications that are intended to recover from session failures. Additionally, by incorporating such functionality at the database driver level rather than the application level, embodiments described herein can advantageously reduce the complexity of such applications.

Figure 3:
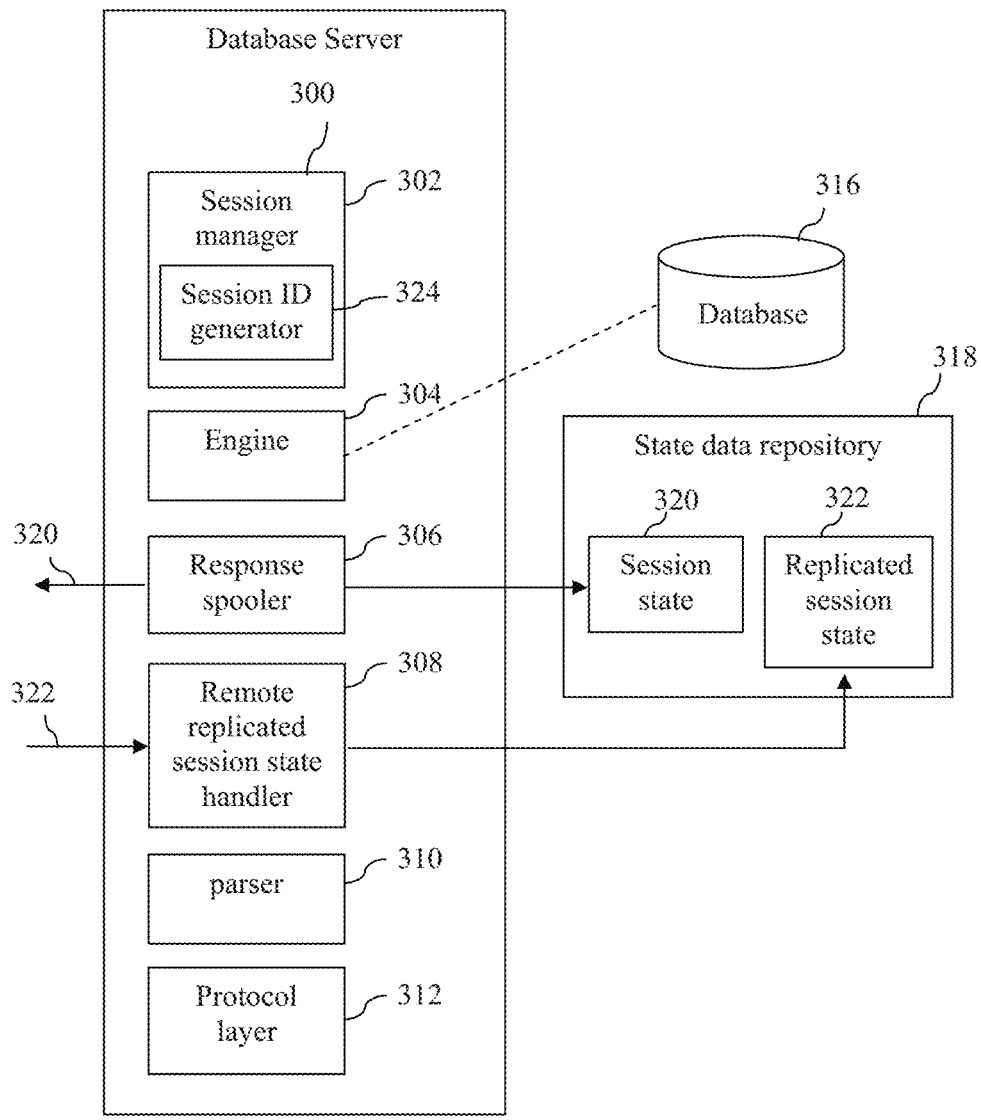
FIG. 3 is a block diagram of the database server shown in FIG. 1, according to an example embodiment.

FIG. 3 is a block diagram that illustrates various elements of a database server 300 in accordance with a further example embodiment. Database server 300 is an example of database servers 104a and 104b shown in FIG. 1. As shown in FIG. 3, in the further example embodiment, database server 300 comprises a session manager 302, an engine 304, a response spooler 306, a remote replicated session state handler 308, a parser 310 and a protocol layer 312. Furthermore, session manager 302 includes a session ID generator 324.

Session manager 302 establishes a session with a client, such as client 200 of FIG. 2, to handle a database query for the client. For instance, session manager 302 may receive a session identifier from the client that is used to establish a session with the client, and is used by session manager 302 to identify communications associated with the established session. For instance, session ID generator 324 may be configured to generate an ID for each session that is established between database server 300 and a client to fulfill a data request (e.g., an SQL SELECT query, etc.) received from an application at the client (e.g., application 202 in FIG. 2). In one embodiment, session ID generator 324 generates a unique ID for each session. The session ID may be transmitted to the client to establish the session with the client, and may be included in subsequent communications to and from the database server that occur within the scope of the established session (to identify those communications as being within the scope of the session).

Furthermore, session manager 302 receives commands associated with the session from the client. In the event of a session failure, session manager 302 may receive a session identifier from a client in a communication transmitted after the session failed, and may enable the failed session to be reestablished if the session identifier received in the communication matches the session identifier stored in the session state for a session.

Engine 304 is configured to interact with one or more databases, such as a database 316 associated with database server 300, to perform various operations on data stored therein based on received commands, where such operations include but are not limited to storing, retrieving, analyzing, and/or manipulating database data.

Response spooler 306 is intended to represent one implementation of response spoolers 114a and 114b described above in reference to system 100 of FIG. 1 and thus performs the functions attributed to each of response spoolers 114a and 114b. For instance, response spooler 306 may spool data retrieved by engine 304 in response to a command to a session state 320, which is an example of session state 108 described above. Furthermore, response spooler 306 may store the session identifier and the command identifier associated with the command in session state 320. As shown in FIG. 3, response spooler 306 stores session state 320 in a state data repository 318. State data repository 318 (and any further state data repositories described elsewhere herein) may include one or more of any type of storage mechanism, including a magnetic disc (e.g., a hard disk drive), an optical disc (e.g., an optical disk drive), a memory device such as a RAM device (e.g., a cache memory, for temporary storage), etc., and/or any other suitable type of storage medium.

Still further, after generating session state 320, response spooler 306 may replicate (e.g., copy) session state 320 to at least one additional database server (as indicated by the left-directed arrow labeled 320 in FIG. 3). The replicated session state enables the one or more additional database servers to respond to the command having a command identifier included in session state 320 if the current session fails.

Remote replicated session state handler 308 is configured to receive replicated session states from other database servers. For instance, as shown in FIG. 3, remote replicated session state handler 308 receives a replicated session state 322 from a remote server (not shown in FIG. 3), and stores replicated session state 322 in state data repository 318. Replicated session state 322 enables database server 300 to respond to a command that was in process having a command identifier and associated session identifier included in replicated session state 320 if that session fails at a different database server.

Parser 310 is configured to interpret client-generated commands that are received by database server 300 and to encode information to be sent to clients in accordance with a particular application layer protocol, such as but not limited to MS-TDS. In one embodiment, protocol layer 312 is intended to represent one or more computer programs executing in hardware (e.g., one or more processors) utilized by database server 300 to carry encoded information produced by parser 310 to the appropriate clients and to receive encoded commands therefrom.

Figure 4:
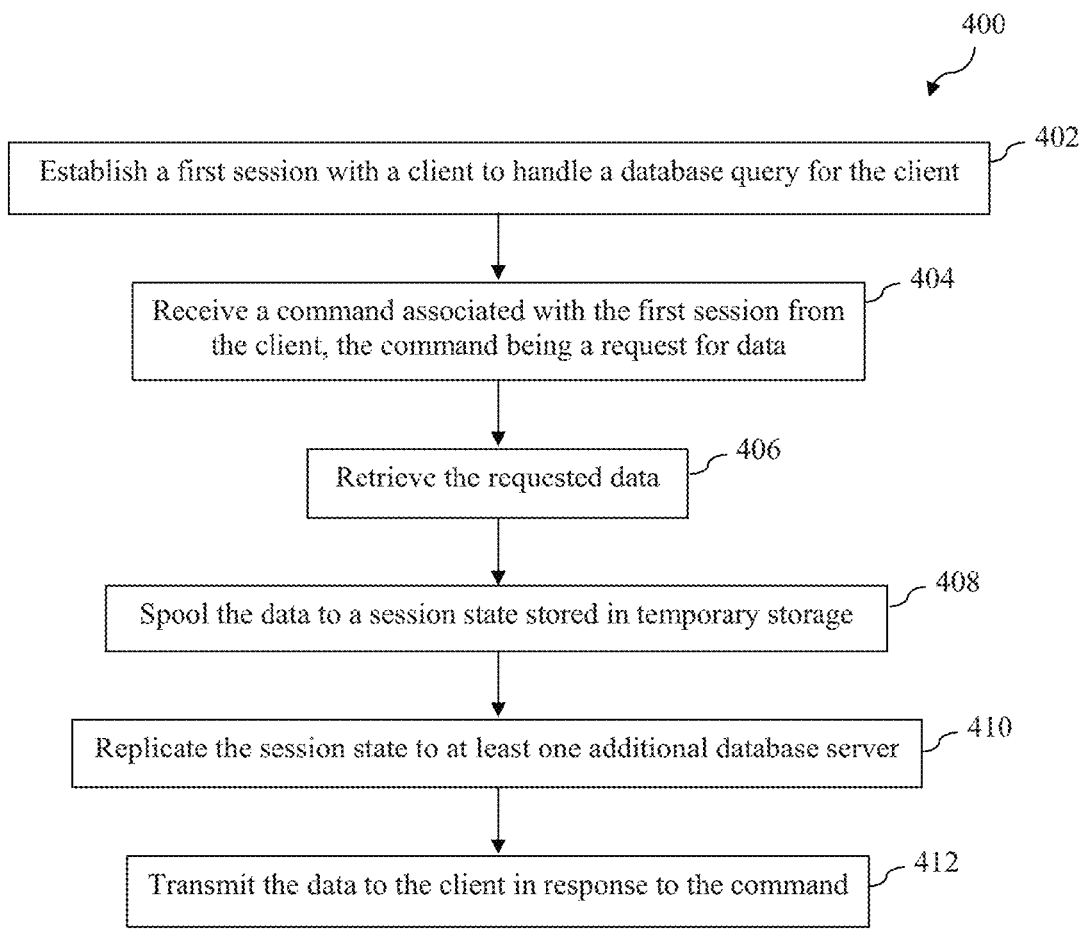
FIG. 4 depicts a flowchart of a process performed at a database server for performing commands associated with a session between the database server and a client, and replicating response data, according to an example embodiment.
Figure 5:
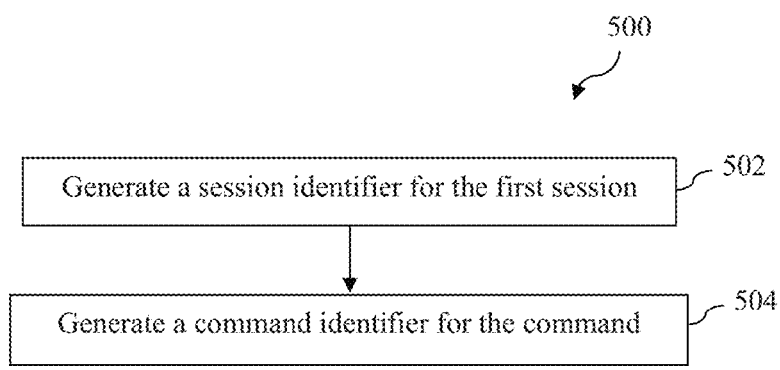
FIG. 5 depicts a flowchart of a process for generating session and command identifiers, according to an example embodiment.

FIG. 4 depicts a flowchart 400 of a process performed at a database server for executing commands associated with a session between the database server and a client, including replicating response data, according to an example embodiment. For the sake of illustration, flowchart 400 will now be described with continued reference to example embodiments described above in reference to FIGS. 1-3. However, the method of flowchart 400 is not limited to those embodiments.

As shown in FIG. 4, the method of flowchart 400 begins at step 402. In step 402, a first session is established with a client to handle a database query for the client. For example, as described above, session ID generator 324 of database server 300 (FIG. 3) may generate a session identifier used to identify a particular session. For instance, in an embodiment, session ID generator 324 may perform a step 502 of a flowchart 500 shown in FIG. 5. In step 502, a session identifier is generated for the first session. Session ID generator 324 may generate the session identifier in any manner, including incrementing the numerical value of a prior generated session identifier, generating the session identifier in a random or pseudorandom manner, or generating the session identifier in another manner.

Referring to FIG. 1, database server 104a may transmit the session identifier to a client to initiate a session with the database server. For instance, database server 104a may transmit the session identifier to client 102 in a communication transmitted over communication channel 106a (e.g., in response to a request from client 102), may store the received session identifier, and may thereby establish a session with client 102. In establishing the session, the client and database server may negotiate various parameters of the session, including authentication and encryption techniques/protocols, etc.

Note that in an alternative embodiment, client 102 may generate the session identifier, and may transmit the generated session identifier to database server 104a to establish the session.

Referring back to FIG. 4, in step 404, a command associated with the first session is received from the client, the command being a request for data. In embodiments, any number of commands may be transmitted from client 102 to database server 104a, including requests for database data. Database server 104a may respond to each of the commands. Database server 104a may receive a command ID associated with each of the one or more received commands. As discussed above, such command IDs may be generated by command ID generator 216 within client 200 (FIG. 2) and transmitted to database server 104a along with their associated commands. For instance, in an embodiment, command ID generator 216 may perform a step 504 of flowchart 500 shown in FIG. 5. In step 504, a command identifier is generated for the command. Command ID generator 216 may generate the command identifier in any manner, including incrementing the numerical value of a prior generated command identifier (e.g., generating command identifiers in sequence), generating the command identifier in a random or pseudorandom manner, or generating the command identifier in another manner.

With reference to the implementation of client 200 shown in FIG. 2, such commands may be encoded by parser 218 and sent to database server 104a via protocol layer 220. With reference to the implementation of database server 300 shown in FIG. 3, the encoded commands may be received via protocol layer 312 and interpreted by parser 310.

Referring back to FIG. 4, in step 406, the requested data is retrieved. In embodiments, database server 104a attempts to execute the command received by database server 104a in step 404. With reference to the implementation of database server 300 shown in FIG. 3, engine 304 may retrieve data requested by the received command from database 316.

In step 408, the data is spooled to a session state stored in a repository. For example, referring to FIG. 3, response spooler 306 may spool the data retrieved by engine 304 to session state 320 in state data repository 318. Response spooler 306 may also include in session state 320 the session identifier and the command identifier for the command being fulfilled by the retrieved data, and may associate the command identifier with the retrieved data corresponding to the command.

In step 410, the session state is replicated to at least one additional database server. For instance, as shown in FIG. 3, response spooler 306 may transmit a copy of session state 320 to one or more other database servers. For instance, referring to FIG. 1, a replication of session state 108 may be received by database server 104b as replicated session state 110 (and stored in storage at database server 104b). Replicated session state 110 enables database server 104b (and any further database servers that received replicated session state 110) to respond to the command if the session with database server 104*a* fails.

In step 412, the data is transmitted to the client in response to the command. Referring to FIG. 1, the data stored in session state 108 may be transmitted from database server 104*a* over communication channel 106*a* to client 102 in response to the command received in step 404. If all of the data is successfully transmitted from database server 104*a* to client 102 (e.g., as indicated by one or more acknowledgements received from client 102), response spooler 306 may optionally delete the retrieved data from session state 108.

By generating and storing session state 108, response spooler 306 (FIG. 3) enables client 102 and database server 104*a* to recover from a session failure. After detecting the failure, such as by receiving an indication of a connection or communication failure/error, client 102 can retransmit the current command with the session identifier of the failed session. Database server 104*a* may receive the command and session identifier, and the session may be reestablished between client 102 and database server 104*a* by establishing a second session based on the same session identifier. The data stored in session state 108 may be transmitted to client 102 in response to the command without having to re-retrieve the data from a database, and the session may continue from that point (e.g., with additional commands transmitted from client 102 to database server 104*a*).

Furthermore, by replicating session state 108 to other database servers as replicated session state 110, client 102 and another database server, such a database server 104*b*, are enabled to recover from a session failure between client 102 and database server 104*a*. After detecting a failure, such as by receiving an indication of a network connection or communication failure/error, client 102 can retransmit the current command with the session identifier of the failed session. Database server 104*b* may receive the command and session identifier, such as through a network gateway device that transmits them to database server 104*b* rather than database server 104*a* (e.g., because database server 104*a* is not operating, etc.) In another embodiment, client 102 may include a list of database servers, and may try a different database server in the list when the session with a current database server fails (e.g., after one or more retries, etc.). Database server 104*b* may establish a session between client 102 and database server 104*b* based on the same session identifier. The data stored in replicated session state 110 may be transmitted to client 102 in response to the command without having to re-retrieve the data, and the session may continue from that point (e.g., with additional commands transmitted from client 102 to database server 104*b*).

For instance, the next subsection describes recovering from a session failure with the same database server as has previously participated in the session, followed by a subsection describing recovering from a session failure with a different database server than previously participated in the session.

III. Example Embodiments for Recovery from Session Failures Between a Client and a Database Server As described above, a database query session between a client and a database server may undergo a session failure (e.g., during or before step 412 of flowchart 400 in FIG. 4). The session failure may occur for a variety of reasons, including a network failure between the client and database server, or a failure in the database server. Subsequent to such a failure, in an embodiment, the session between the client and the database server may be recovered, and any data request commands that were being processed at the time of the session failure may be continued in an efficient manner.

Figure 6:
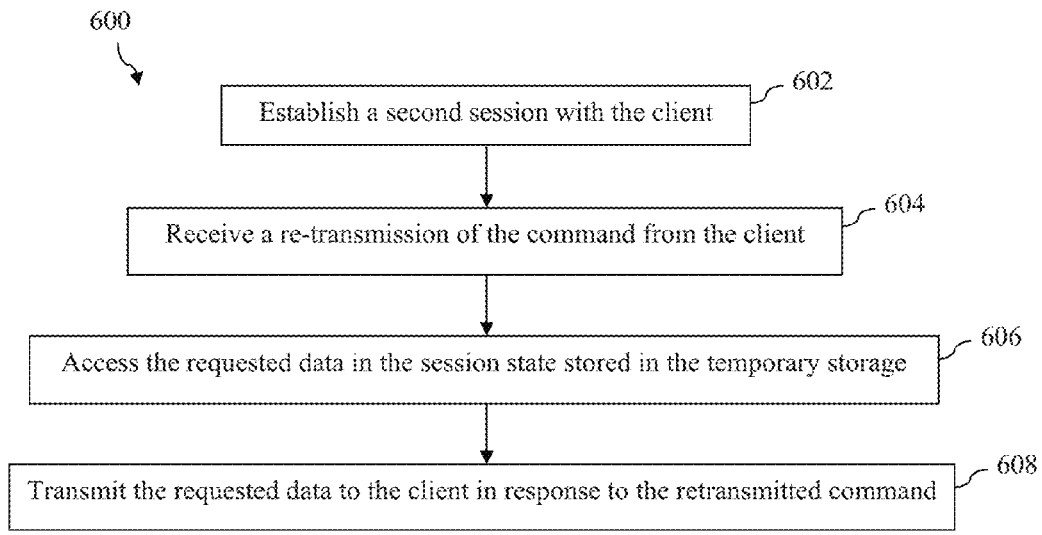
FIG. 6 depicts a flowchart of a process performed at a database server for recovering from a session failure with a client, according to an example embodiment.

FIG. 6 depicts a flowchart 600 of a process performed at a database server for recovering from a session failure with a client, according to an example embodiment. For the sake of illustration, flowchart 600 will now be described with continued reference to example embodiments described above in reference to FIGS. 1-3. However, the method of flowchart 600 is not limited to those embodiments.

As shown in FIG. 6, the method of flowchart 600 begins at step 602. In step 602, a second session is established with the client. Referring to FIG. 1, after the session failure, client 102 may attempt to re-establish the failed session with database server 104*a* as a second session. In such case, client 102 may re-transmit the session identifier used for the failed session to database server 104*a* in a request to re-establish the session. The request to re-establish the session may be received by database server 104*a*.

Figure 7:
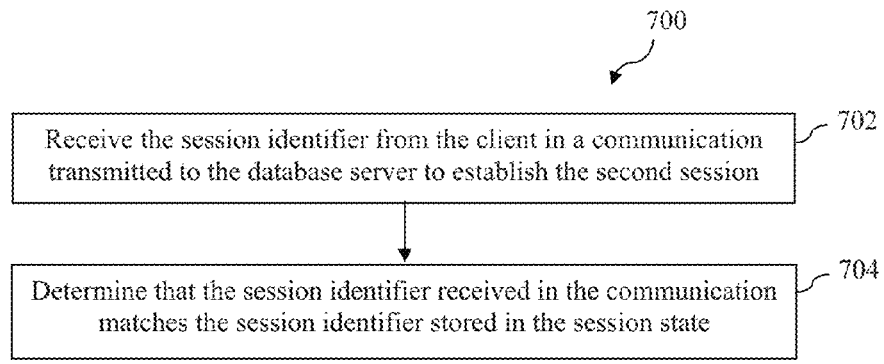
FIG. 7 depicts a flowchart of a process performed at a database server to identify a previously defined session, according to an example embodiment.

Database server 104*a* may analyze the received request to re-establish the session to determine whether to establish a second session with client 102. For instance, in an embodiment, database server 104*a* may perform step 602 according to FIG. 7. FIG. 7 depicts a flowchart 700 of a process performed at a database server to identify a previously defined session, according to an example embodiment.

As shown in FIG. 7, flowchart 700 begins with a step 702. In step 702, the session identifier is received from the client in a communication transmitted to the database server to establish the second session. As described above, database server 104*a* may receive the session identifier used for the failed session from client 102 in a request to re-establish the session.

In step 704, it is determined that the session identifier received in the communication matches the session identifier stored in the session state. In an embodiment, database server 104*a* may compare the session identifier received in step 702 to session identifiers stored in one or more session states to determine whether the received session identifier is for a pre-existing session.

Figure 8:
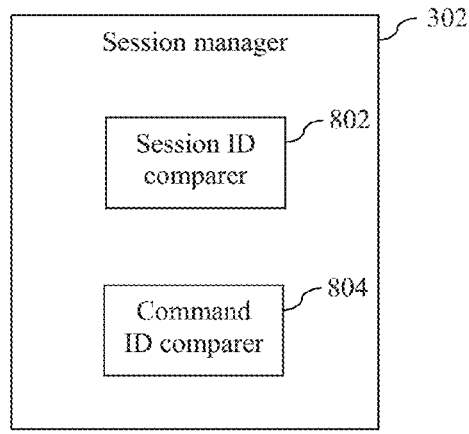
FIG. 8 is a block diagram of a session manager of a database server configured to identify commands associated with a previously defined session, according to an example embodiment.

For instance, in an embodiment, session manager 302 of FIG. 3 may perform the comparison. FIG. 8 is a block diagram of session manager 302 of FIG. 3, according to an example embodiment. As shown in FIG. 8, session manager 302 may include a session ID comparer 802 and a command ID comparer 804. Session ID comparer 802 is configured to compare session identifiers received in communications from clients to session identifiers stored in session states. Session ID comparer 802 may perform step 704 by comparing the session identifier received in the request to reestablish the session to the session identifier in session state 108 (FIG. 1). If the session identifiers match, session ID comparer 802 indicates a match, and session manager 302 may enable the session to be reestablished. If the received session identifier does not match a session identifier in a stored session state, session ID comparer 802 indicates a match is not found. In such case, session manager 302 may not enable the session to be reestablished. (Instead, the session may potentially be reestablished with a different database server, if a match occurs at that different database server).

Referring back to FIG. 6, in step 604, a re-transmission of the command is received from the client. Client 102 may re-transmit a command that was previously transmitted to database server 104*a* that was not completely fulfilled due to the session failure. The retransmitted command may be received by database server 104*a*.

Database server 104*a* may analyze the received retransmitted command to determine how to proceed. Database server 104*a* may determine whether the received command is indicated in session state 108 to determine whether the command has been processed. For instance, in an embodiment, referring to FIG. 8, command ID comparer 804 of session manager 302 may compare the command identifier for the received command to the command identifier stored in session state 108. If the command identifiers match, command ID comparer 804 indicates a match, and session manager 302 may respond to the command with at least a portion of the corresponding data stored in session state 108. If the received command identifier does not match the command identifier in session state 108, command ID comparer 804 indicates a match is not found. In such case, session manager 302 may not respond with the data included in session state 108, and may optionally treat the command as a new command (e.g., according to steps 404-412 of FIG. 4).

Note that in embodiments, the request to reestablish the session (step 602) and the retransmission of the command (step 604) may be received by database server 104*a* from client 102 in a same communication or in separate communications.

In step 606, the requested data is accessed in the session state stored in the temporary storage. Because the received command identifier matched the command identifier in session state 108, session manager 302 may access the data stored in session state 108 to be transmitted to client 102.

In step 608, the requested data is transmitted to the client in response to the retransmitted command. As shown in FIG. 1, the data stored in session state 108 in association with the command identifier may be transmitted from database server 104*a* over communication channel 106*a* to client 102 in response to the command received in step 604. If all of the data is successfully transmitted from database server 104*a* to client 102 (e.g., as indicated by one or more acknowledgements received from client 102), response spooler 306 may optionally delete the data from session state 108.

Note that in one embodiment, the entirety of the retrieved data stored in session state 108 may be transmitted to client 102 in response to the re-transmitted command. In some cases, prior to the session failure, client 102 may have already received a first portion of the retrieved data (e.g., one or more rows, one or more data packets, etc.) of session state 108 from database server 104*a*. Due to the session failure, a second portion of the retrieved data of session state 108 may not have been transmitted to client 102. As such, in an embodiment, in step 604, client 102 may provide an indication of the portion of the data of session state 108 that was received prior to the session failure (or may provide an indication of the portion of the data of session state 108 that was not received). For instance, the portion of data received (or not received) may be indicated as one or more rows of one or more tables, as one or more data packets (e.g., using packet identifiers, etc.), and/or in another form. In response, in steps 606 and 608, database server 104*a* may access the data in session state 108, and may transmit the portion of data that was not already received to client 102 (rather than transmitting the retrieved data in session state 108 in its entirety).

Figure 9:
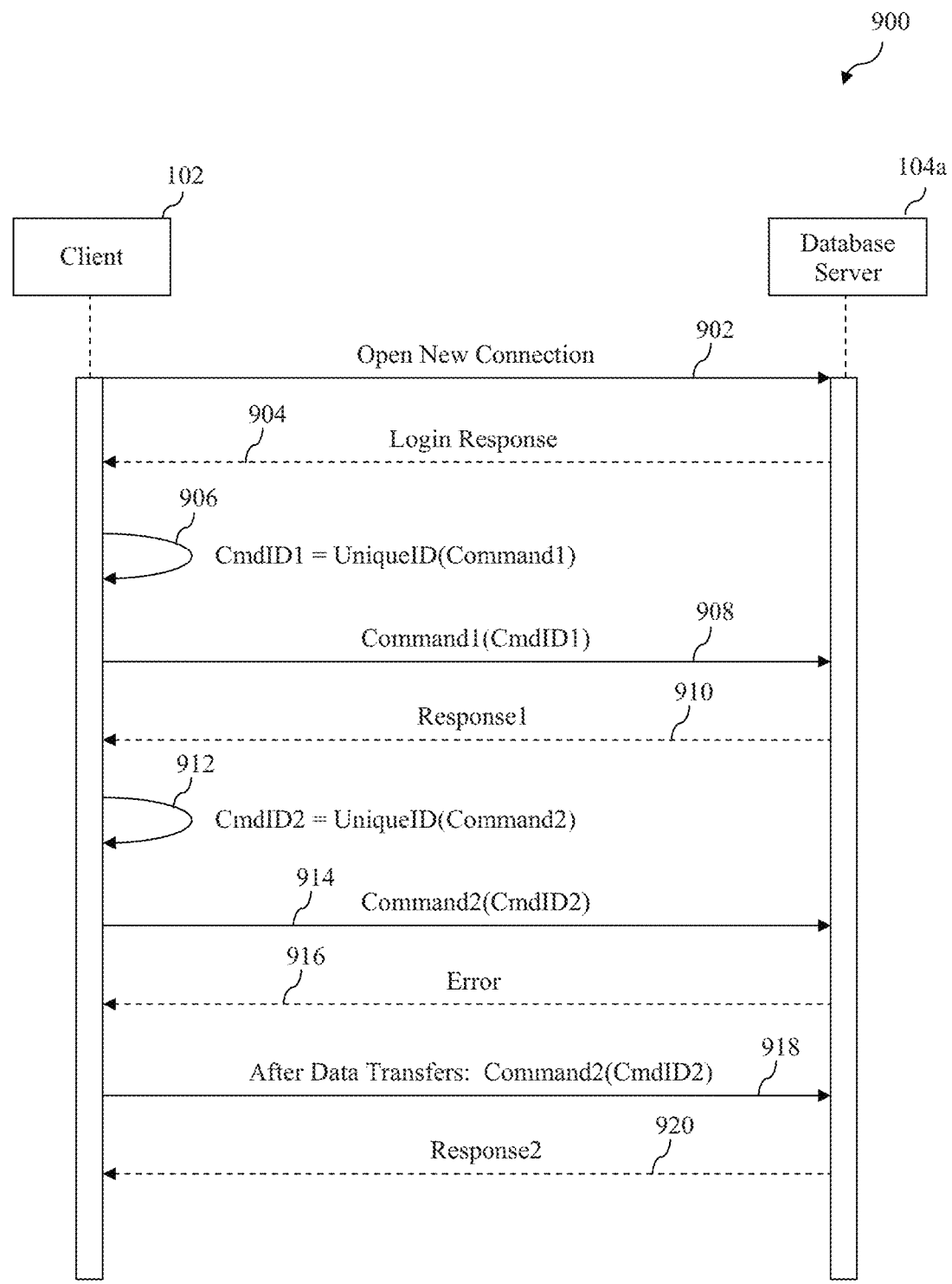
FIG. 9 is a sequence diagram that illustrates a flow of information between a client and a database server in a system that enables command completion in the event of session failures, according to an example embodiment.

FIG. 9 is a sequence diagram 900 that illustrates an example flow of information between client 102 and database server 104*a* in accordance with an embodiment. Sequence diagram 900 is described herein merely to facilitate a further understanding of the manner in which system 100 may facilitate recovery from session failures and is not intended to be limiting.

As shown in FIG. 9, the flow of information depicted by sequence diagram 900 begins when client 102 sends a request 902 to database server 104*a* to open a new connection. In response to receiving request 902, database server 104*a* may generate a session identifier for the session, and may send a login response 904 to client 102 that includes the generated session identifier, thereby establishing the requested connection. Alternatively, client 102 may generate the session identifier, and may provide the generated session identifier to database server 104*a* to establish the session.

Subsequent to the establishment of the connection, client 102 generates a command, referred to as "Command1," for transmission to database server 104*a*. Client 102 then applies a method referred to as "UniqueID" to Command1 to obtain a unique ID associated therewith, referred to as "CmdID1." This is shown as event 906 in FIG. 9.

After client 102 has obtained the unique identifier CmdID1 associated with Command1, client 102 sends both Command1 and its associated unique ID CmdID1 to database server 104*a* as part of a message 908. The session identifier may optionally be sent with Command1 to identify Command1 as being within the scope of the established session.

Database server 104*a* receives Command1 and executes it successfully, returning a response 910, referred to as "Response1," to client 102. Response1 may include various results and/or other information relating to the execution of Command1 by database server 104*a*. After database server 104*a* has successfully executed Command1, it also stores the unique ID CmdID1 in a repository that is accessible thereto along with an indication that Command1 has executed successfully. Database server 104*a* may store the unique ID CmdID1 in association with the session identifier in session state 108. In certain embodiments, such session may comprise a virtual session.

Subsequent to receiving response 910, client 102 generates another command, referred to as "Command2," for transmission to database server 104*a*. Client 102 then applies the UniqueID method to Command2 to obtain a unique ID associated therewith, referred to as "CmdID2." This is shown as event 912 in FIG. 9.

After client 102 has obtained the unique identifier CmdID2 associated with Command2, client 102 sends both Command2 and its associated unique ID CmdID2 to database server 104*a* as part of a message 914. The session identifier may optionally be sent with Command2 to identify Command2 as being within the scope of the established session.

After message 914 is sent, client 102 receives an indication 916 that an error has occurred. Such error may result from some failure of communication between client 102 and database server 104*a* or from a breaking of the session that was established between client 102 and database server 104*a*.

Because such error has occurred, client 102 cannot determine whether Command2 was successfully executed by database server 104*a*, or client 102 may have received only a portion of the requested data. Consequently, client 102 may re-establish a new session with database server 104*a* that is part of a same virtual session as the previously-broken session. Furthermore, client 102 re-transmits Command2 along with its unique ID CmdID2 to database server 104*a* as part of a message 918.

When database server 104a receives Command2 and its unique ID CmdID2, it checks to determine if CmdID2 has already been stored therein in session state 108. This may entail checking all command IDs associated with the session over which message 918 was received. If CmdID2 has already been stored in session state 108, database server 104a may send a response 920 (shown as "Response2") to client 102 that includes the retrieved data that was spooled to session state 108 when Command2 was previously executed. As described above, database server 104a may transmit all of the data of session state 108 that was retrieved for command2, or may transmit a portion that was indicated by client 102 as not received.

As shown by the foregoing, system 100 advantageously operates to ensure that database server 104a can recover from a session failure, and does not retrieve requested data from the database more than once, even if client 102 sends the same command multiple times. Instead, the data is retrieved from session state 108 (e.g., from cache, or other storage). This enables handling of database requests at client 102 at the database driver level, thereby unburdening the application programmer from having to include retry features in the application and thus simplifying the application logic.

IV. Example Embodiments for Recovery from Session Failures Between a Client and a Database Server Using a Different Database Server As described above, a database query session between a client and a database server may undergo a session failure (e.g., during or before step 412 of flowchart 400 in FIG. 4). The session failure may occur for a variety of reasons, including a network failure between the client and database server, or a failure in the database server. Subsequent to such a failure, in an embodiment, rather than recovering the session between the client and the same database server, the session may be recovered with a different database server. For instance, the original database server may not be available to participate in a new session (may not be functioning properly, etc.). As such, a different database server may be used to recover the session with the client. Any data request commands that were being processed at the time of the session failure may be continued by the different database server in an efficient manner.

Figure 10:
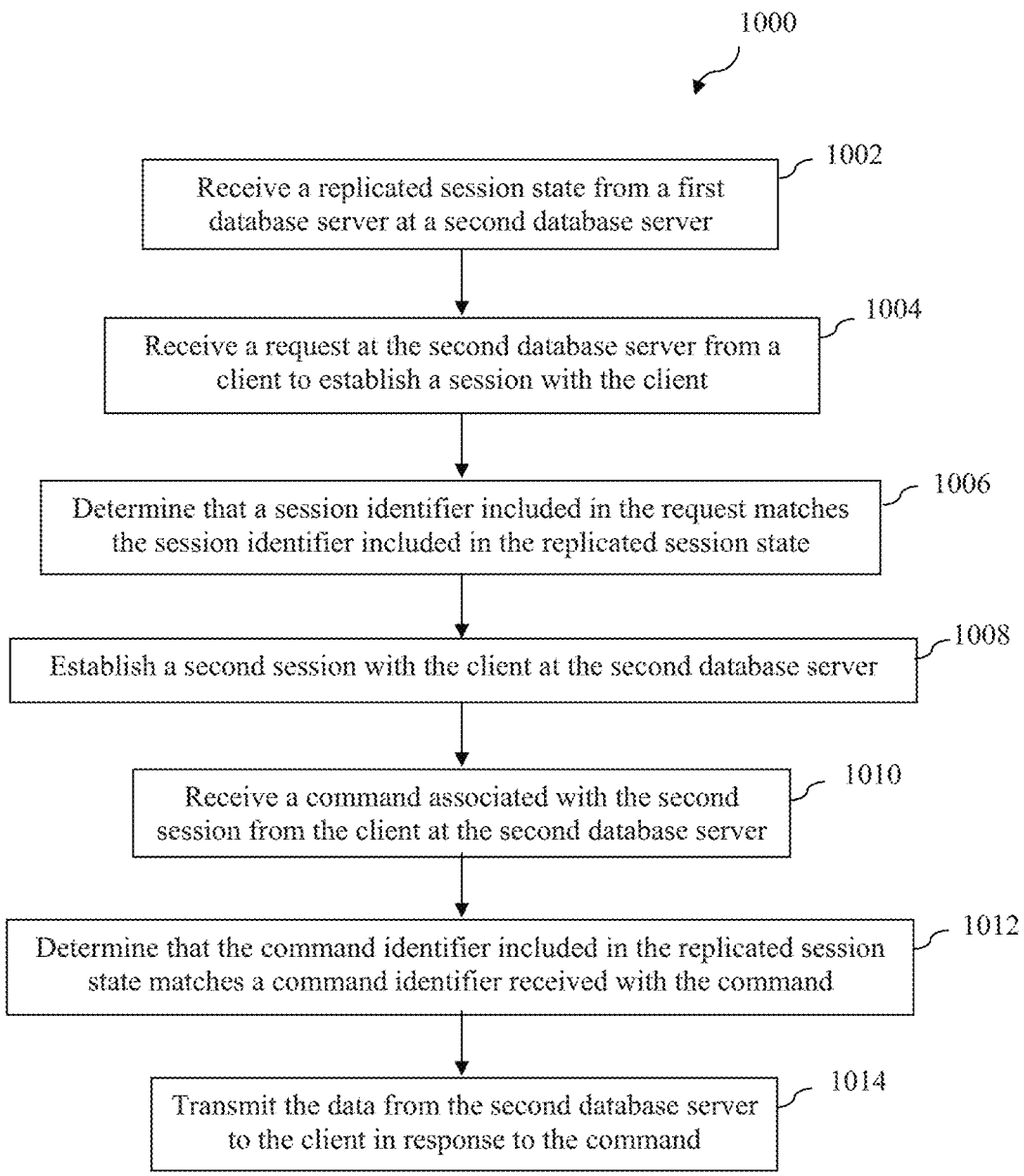
FIG. 10 depicts a flowchart of a process performed at a second database server to recover from a session failure between a first database server and a client, according to an example embodiment.

FIG. 10 depicts a flowchart 1000 of a process performed at a second database server to recover from a session failure between a first database server and a client, according to an example embodiment. For the sake of illustration, flowchart 1000 will now be described with continued reference to example embodiments described above in reference to FIGS. 1-3. However, the method of flowchart 1000 is not limited to those embodiments.

As shown in FIG. 10, the method of flowchart 1000 begins at step 1002. In step 1002, a replicated session state is received from a first database server at a second database server. For example, as shown in FIG. 1, second database server 104b may receive replicated session state 110 from first database server 104a. As described above, replicated session state 110 is a copy of session state 108, which stores information regarding a session between client 102 and database server 104a.

In step 1004, a request is received at the second database server from a client to establish a session with the client. After detecting a failure in the session between client 102 and database server 104a, client 102 may attempt to reestablish the session by transmitting a request. Database server 104b may receive the request from client 102 indirectly, such as through a network gateway device that selects active database servers to respond to database requests for a particular domain or cluster of servers. Alternatively, database server 104b may receive the request directly from client 102. For instance, client 102 may include a list of associated database servers (e.g., that handle requests for one or more common databases) with addresses for each of the database servers (e.g., IP addresses, etc.). Client 102 may first attempt to reestablish the session with database server 104a, and if database server 104a is non-responsive, may try to reestablish the session with a different database server in the list by communicating with that database server directly. In the current example, the request to reestablish the session is received by database server 104b as an alternative database server.

In step 1006, a session identifier included in the request is determined to match the session identifier included in the replicated session state. For instance, as described above, session ID comparer 802 of session manager 302 (FIG. 3) may compare the session identifier received in the request to the session identifier in replicated session state 110 (FIG. 1).

In step 1008, a second session is established with the client at the second database server. If the session identifiers match in step 1006, session ID comparer 802 indicates a match, and session manager 302 may enable the session to be reestablished, and may store an indication as such. If the received session identifier does not match a session identifier in a stored session state, session ID comparer 802 indicates a match is not found. In such case, session manager 302 may not enable the session to be reestablished.

In step 1010, a command associated with the second session is received from the client at the second database server. Client 102 may transmit a command to database server 104b that was previously transmitted to database server 104a that was not completely fulfilled due to the session failure. The transmitted command may be transmitted over communication channel 106b and received by database server 104b. Note that database server 104a may not have transmitted any response to the unfulfilled command, or database server 104a may have transmitted a portion of the data requested by the unfulfilled command to client 102.

In step 1012, the command identifier included in the replicated session state is determined to match a command identifier received with the command. In an embodiment, referring to FIG. 8, command ID comparer 804 of session manager 302 may compare the command identifier for the received command to the command identifier stored in replicated session state 110. If the command identifiers match, command ID comparer 804 indicates a match, and session manager 302 may respond to the command with at least a portion of the data stored in replicated session state 110 corresponding to the command identifier. If the received command identifier does not match the command identifier in replicated session state 110, command ID comparer 804 indicates a match is not found. In such case, session manager 302 may not respond with the data included in session state 108, and may optionally treat the command as a new command of the session (e.g., according to steps 404-412 of FIG. 4).

In step 1014, the data is transmitted from the second database server to the client in response to the command. As shown in FIG. 1, the data stored in replicated session state 110 may be transmitted from database server 104b over communication channel 106b to client 102 in response to the command received in step 1010. If all of the data is successfully received by client 102 (e.g., as indicated by one or more acknowledgements received from client 102), response spooler 306 of database server 104b may optionally delete the data from replicated session state 110.

In this manner, replication of a session state is used to enable recovery from a failed session by a different database server than originally established the session with the client. In the embodiment of FIG. 3, each database server may include a corresponding repository (e.g., state data repository 318) to store a copy of the session state—either the original copy (session state 320) at the first database server (e.g., database server 104a of FIG. 1) or replicated copies (replicated session state 322) at the additional database servers (e.g., database server 104b of FIG. 1). It is noted, other approaches may be used to achieve this goal.

Figure 11:
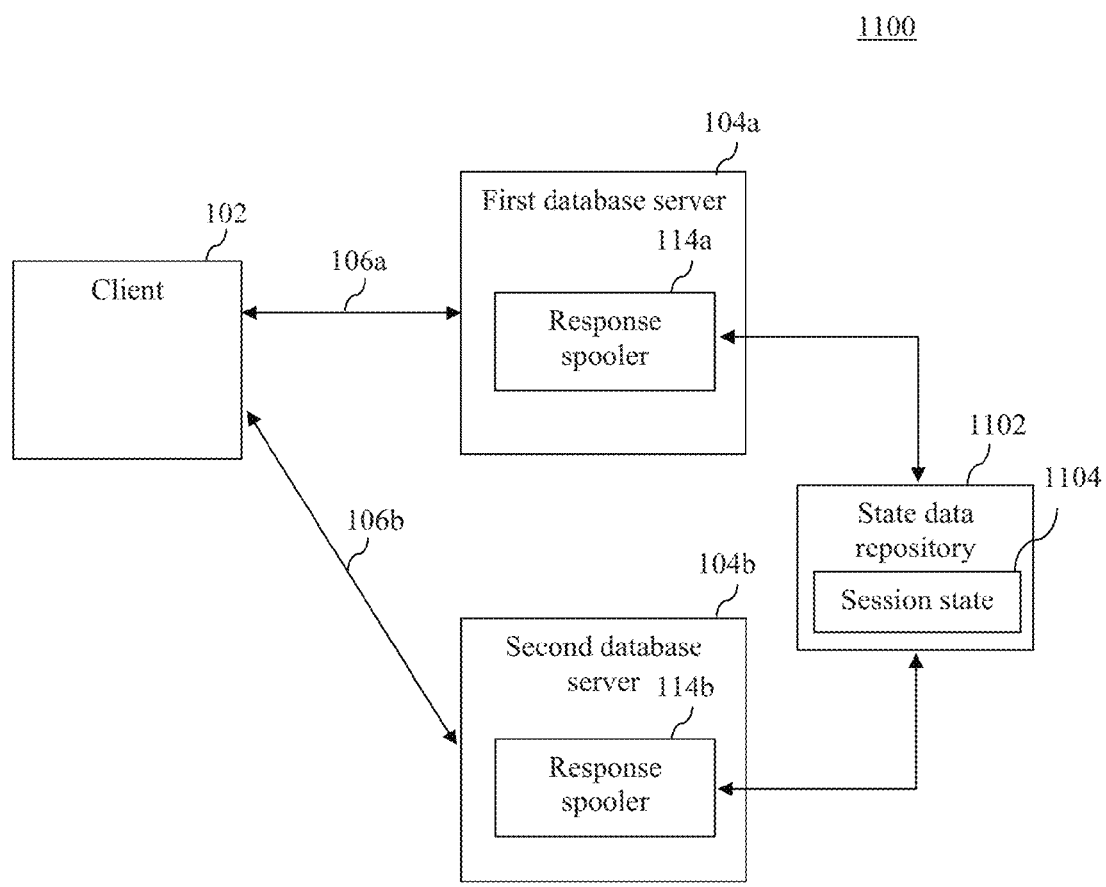
FIG. 11 is a block diagram of an example system that facilitates recovery from session failures in which state-related information is shared between a first database server and a second database server via use of a shared memory, according to an example embodiment.

For example, FIG. 11 is a block diagram of an example system 1100 that utilizes a shared memory approach to achieve the goal. System 1100 includes client 102, first database server 104a, second database server 104b, first response spooler 114a, and second response spooler 114b, and operates in a substantially similar manner to system 100 of FIG. 1. However, in system 1100, rather than using replication to ensure that second response spooler 114b has access to a separate copy of a session state generated by first response spooler 114a, a shared state data repository 1102 is used. In accordance with this approach, first response spooler 114a and second response spooler 114b are both able to access the same session state 1104 stored in shared state data repository 1102. Consequently, session state information stored in shared data repository 1102 by first response spooler 114a will subsequently be accessible to second response spooler 114b (e.g., to recover and/or continue a failed session between database server 104a and client 102). Likewise, session state information stored in shared data repository 1102 by second response spooler 114b will subsequently be accessible to first response spooler 114a.

Figure 12:
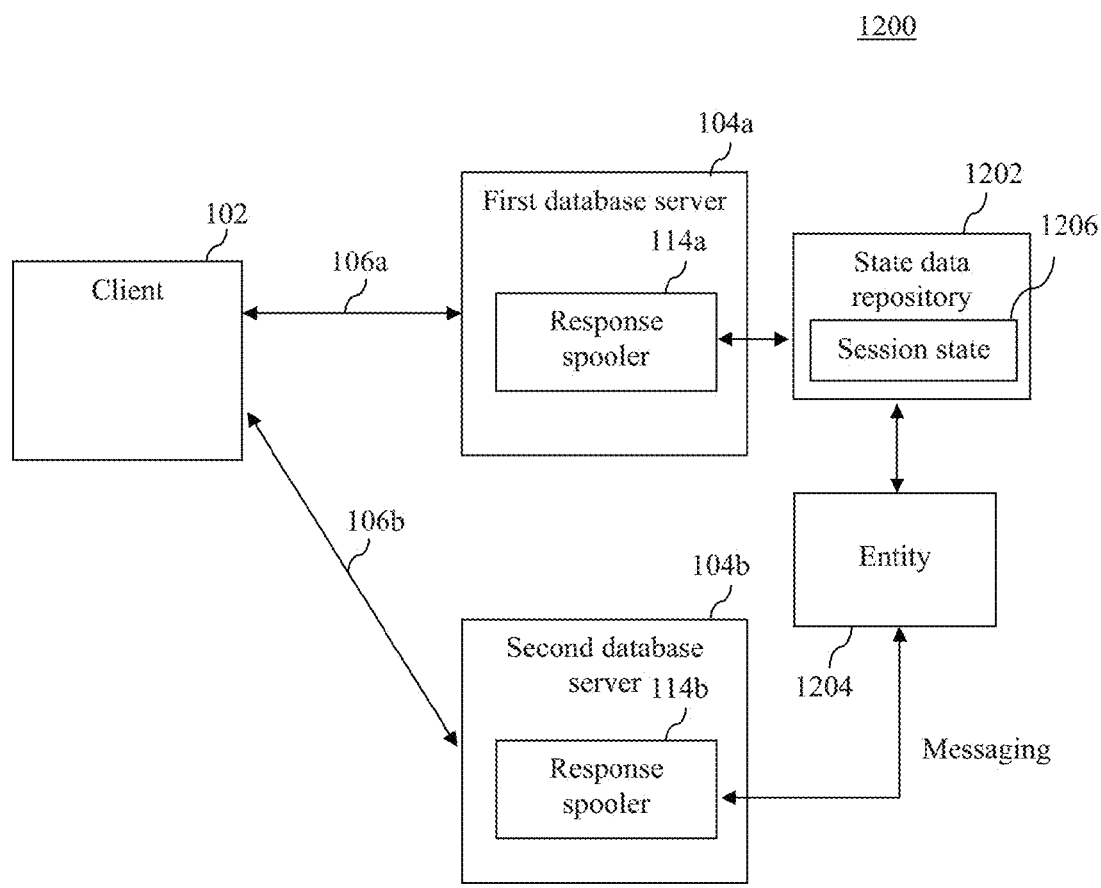
FIG. 12 is a block diagram of an example system that facilitates recovery from session failures in which state-related information is shared between a first database server and a second database server via messaging, according to an example embodiment.

FIG. 12 is a block diagram of an example system 1200 that utilizes a messaging approach to achieve the same goal. System 1200 includes client 102, first database server 104a, second database server 104b, first response spooler 114a, and second response spooler 114b, and operates in a substantially similar manner to system 100 of FIG. 1. However, in system 1200, rather than using replication or a shared repository to ensure that second response spooler 114b has access to a session state 1206 previously stored by first response spooler 114a (and vice versa), a messaging approach is used. In accordance with this approach, first response spooler 114a is configured to store session state 1206 (e.g., session IDs, command IDs, retrieved data, and/or further data) in a state data repository 1202. When second response spooler 114b determines that it will require access to session state 1206 (e.g., to recover and/or continue a failed session between database server 104a and client 102), second response spooler 114b may transmit a message to an entity 1204 having access to state data repository 1202, and entity 1204 sends the corresponding data to second response spooler 114b.

V. Example Processor-Based System Implementation

Client 102, database server 104a, database server 104b, response spooler 114a, response spooler 114b, client 200, application 202, database driver 204, API 212, session ID generator 324, command ID generator 216, parser 218, protocol layer 220, database server 300, session manager 302, engine 304, response spooler 306, remote replicated session state handler 308, parser 310, protocol layer 312, session ID comparer 802, command ID comparer 804, entity 1204, flowchart 400, flowchart 500, flowchart 600, flowchart 700, and flowchart 1000 may be implemented in hardware, or hardware and any combination of software and/or firmware. For example, client 102, database server 104a, database server 104b, response spooler 114a, response spooler 114b, client 200, application 202, database driver 204, API 212, session ID generator 324, command ID generator 216, parser 218, protocol layer 220, database server 300, session manager 302, engine 304, response spooler 306, remote replicated session state handler 308, parser 310, protocol layer 312, session ID comparer 802, command ID comparer 804, entity 1204, flowchart 400, flowchart 500, flowchart 600, flowchart 700, and/or flowchart 1000 may be implemented as computer program code configured to be executed in one or more processors and stored in a computer readable storage medium. Alternatively, client 102, database server 104a, database server 104b, response spooler 114a, response spooler 114b, client 200, application 202, database driver 204, API 212, session ID generator 324, command ID generator 216, parser 218, protocol layer 220, database server 300, session manager 302, engine 304, response spooler 306, remote replicated session state handler 308, parser 310, protocol layer 312, session ID comparer 802, command ID comparer 804, entity 1204, flowchart 400, flowchart 500, flowchart 600, flowchart 700, and/or flowchart 1000 may be implemented as hardware logic/electrical circuitry.

For instance, in an embodiment, one or more of client 102, database server 104a, database server 104b, response spooler 114a, response spooler 114b, client 200, application 202, database driver 204, API 212, session ID generator 324, command ID generator 216, parser 218, protocol layer 220, database server 300, session manager 302, engine 304, response spooler 306, remote replicated session state handler 308, parser 310, protocol layer 312, session ID comparer 802, command ID comparer 804, entity 1204, flowchart 400, flowchart 500, flowchart 600, flowchart 700, and/or flowchart 1000 may be implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 13:
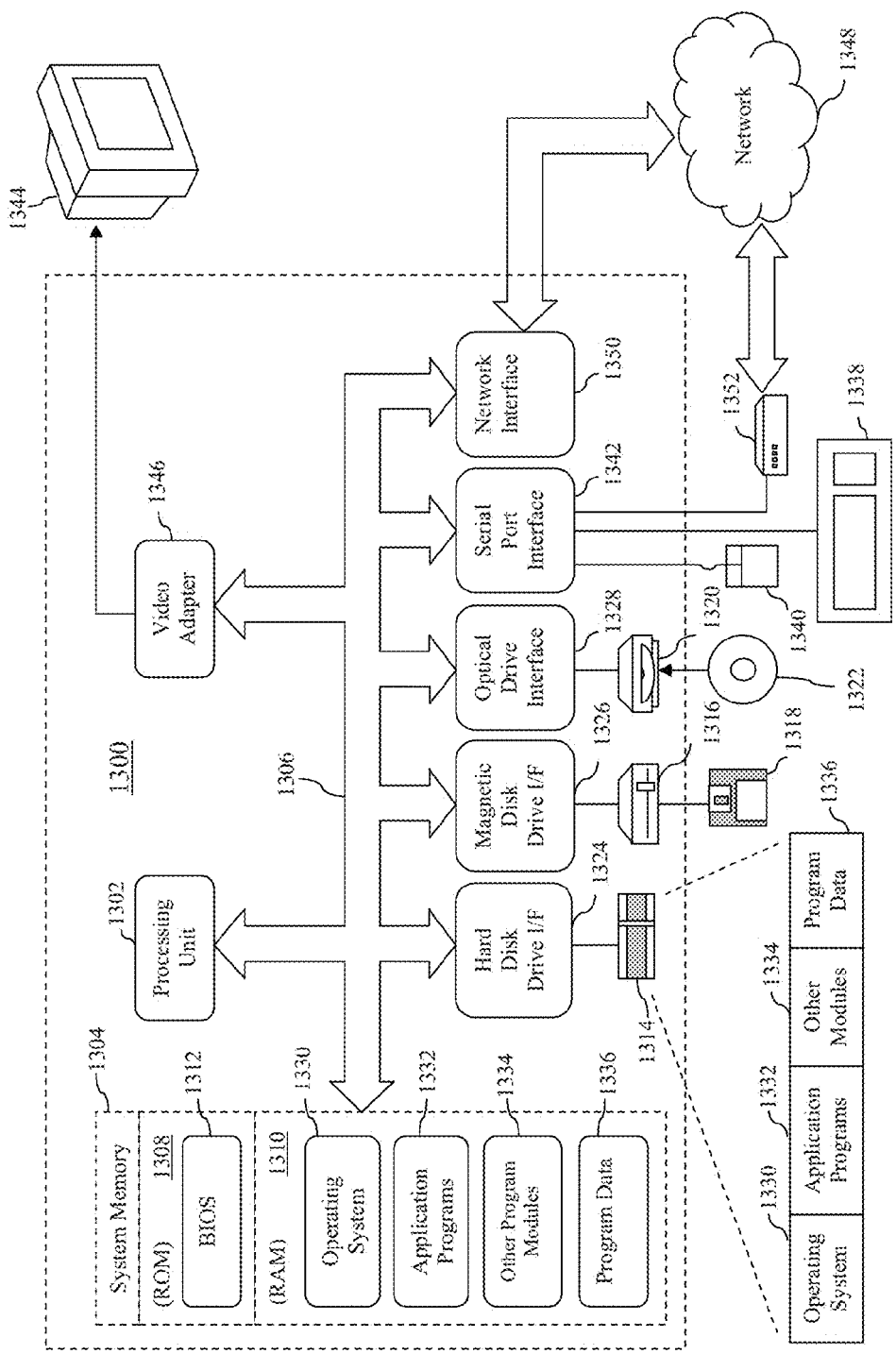
FIG. 13 is a block diagram of an example processor-based system that may be used to implement various embodiments.

FIG. 13 depicts an example processor-based computer system 1300 that may be used to implement various embodiments described herein. For example, system computer system 1300 may be used to implement client 102, database server 104a, database server 104b, client 200, and/or database server 300, as well as various sub-components thereof. The description of computer system 1300 provided herein is provided for purposes of illustration, and is not intended to be limiting. Embodiments may be implemented in further types of computer systems, as would be known to persons skilled in the relevant art(s).

As shown in FIG. 13, computer system 1300 includes a processing unit 1302, a system memory 1304, and a bus 1306 that couples various system components including system memory 1304 to processing unit 1302. Processing unit 1302 may comprise one or more processors or processing cores. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computer system 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, BLU-RAY™ disk or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1330, one or more application programs 1332, other program modules 1334, and program data 1336. In accordance with various embodiments, the program modules may include computer program logic (e.g., computer code or instructions) that is executable by processing unit 1302 to perform any or all of the functions and features of client 102, database server 104a, database server 104b, response spooler 114a, response spooler 114b, client 200, application 202, database driver 204, API 212, session ID generator 324, command ID generator 216, parser 218, protocol layer 220, database server 300, session manager 302, engine 304, response spooler 306, remote replicated session state handler 308, parser 310, protocol layer 312, session ID comparer 802, command ID comparer 804, entity 1204, flowchart 400, flowchart 500, flowchart 600, flowchart 700, and/or flowchart 1000 (including any step of flowcharts 400, 500, 600, 700, and 1000), and/or further embodiments described elsewhere herein.

A user may enter commands and information into computer system 1300 through input devices such as a keyboard 1338 and a pointing device 1340. Other input devices (not shown) may include a microphone, joystick, game pad, game controller, scanner, touch screen and/or touch pad, a voice recognition system to receive voice input, a gesture recognition system to receive gesture input, or the like. In one embodiment, a touch screen is provided in conjunction with a display 1344 to allow a user to provide user input via the application of a touch (as by a finger or stylus for example) to one or more points on the touch screen. These and other input devices are often connected to processing unit 1302 through a serial port interface 1342 that is coupled to bus 1306, but may be connected by other interfaces, such as a parallel port, game port, or a universal serial bus (USB).

A display 1344 is also connected to bus 1306 via an interface, such as a video adapter 1346. In addition to display 1344, computer system 1300 may include other peripheral output devices (not shown) such as speakers and printers.

Computer system 1300 is connected to a network 1348 (e.g., a local area network or wide area network such as the Internet) through a network interface or adapter 1350, a modem 1352, or other suitable means for establishing communications over the network. Modem 1352, which may be internal or external, is connected to bus 1306 via serial port interface 1342.

As used herein, the terms "computer program medium" and "computer-readable medium" are used to generally refer to non-transitory media such as ROM 1308 and RAM 1310 used to implement system memory 1304, the hard disk associated with hard disk drive 1314, removable magnetic disk 1318, removable optical disk 1322, as well as other media such as flash memory cards, digital video disks, and the like.

As noted above, computer programs and modules (including application programs 1332 and other program modules 1334) may be stored on ROM 1308, RAM 1310, the hard disk associated with hard disk drive 1314, the removable magnetic disk 1318, or the removable optical disk 1322. Such computer programs may also be received via network interface 1350 or serial port interface 1342. Such computer programs, when executed by processing unit 1302, enable computer system 1300 to implement features of embodiments discussed herein. Accordingly, such computer programs represent controllers of computer system 1300.

As used herein, the terms "computer program medium," "computer-readable medium," and "computer-readable storage medium" are used to generally refer to media such as the hard disk associated with hard disk drive 1314, removable magnetic disk 1318, removable optical disk 1322, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1332 and other program modules 1334) may be stored on the hard disk, magnetic disk, optical disk, ROM, or RAM. Such computer programs may also be received via network interface 1350, serial port interface 1342, or any other interface type. Such computer programs, when executed or loaded by an application, enable computer system 1300 to implement features of embodiments of the present invention discussed herein. Accordingly, such computer programs represent controllers of the computer system 1300.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

EXAMPLE EMBODIMENTS

In one embodiment, a method in a database server comprises: establishing a first session with a client to handle a database query for the client; receiving a command associated with the first session from the client, the command being a request for data; retrieving the requested data; spooling the data to a session state stored in a repository; replicating the session state to at least one additional database server, the replicated session state enabling the at least one additional database server to respond to the command if the first session fails; and transmitting the data to the client in response to the command.

In an embodiment, the method further comprises: undergoing a failure in the first session due to a failure in a connection between the client and the database server during the first session or due to a failure in the database server.

In an embodiment, wherein if the first session fails, performing: establishing a second session with the client; receiving a re-transmission of the command from the client; accessing the requested data in the session state stored in the repository; and transmitting the requested data to the client in response to the retransmitted command.

In an embodiment, the establishing a first session with a client to handle a database query for the client comprises: generating a session identifier for the first session, and storing the session identifier in the session state in the repository; and said establishing a second session with the client comprises: receiving the session identifier from the client in a communication transmitted to the database server to establish the second session, and determining that the session identifier received in the communication matches the session identifier stored in the session state.

In an embodiment, wherein if the first session fails, performing: establishing a second session with the client; receiving a re-transmission of the command from the client with an indication of a portion of the requested data that was received by the client; and transmitting to the client the data included in the session state other than the indicated portion.

In an embodiment, the receiving a re-transmission of the command from the client with an indication of a portion of the requested data that was received by the client comprises: receiving an indication of at least one row or at least one data packet received by the client.

In an embodiment, the establishing a first session with a client to handle a database query for the client comprises: establishing the first session with the client to perform an SQL (structured query language) SELECT query.

In another embodiment, a method comprises: receiving a replicated session state from a first database server at a second database server, the replicated session state being a copy of a session state generated at the first database server to handle a database query for a client, the replicated session state including a session identifier, a command identifier, and data retrieved from a database at the first database server; receiving a request at the second database server from a client to establish a session with the client due to a failure in a first session established between the client and the first database server; determining that a session identifier included in the request matches the session identifier included in the replicated session state; establishing a second session with the client at the second database server; receiving a command associated with the second session from the client at the second database server; determining that the command identifier included in the replicated session state matches a command identifier received with the command; and transmitting the data from the second database server to the client in response to the command.

In an embodiment, the receiving a command associated with the second session from the client comprises: receiving an indication of at least one row or at least one data packet received by the client in response to an earlier transmission of the command to the first database server; and said transmitting the data to the client in response to the command comprises: transmitting to the client the data included in the replicated session state other than the indicated at least one row or at least one data packet in response to the command.

In another embodiment, the system comprises: a first database server that includes a session manager that establishes a first session with a client to handle a database query for the client, and receives a command associated with the first session from the client, the command being a request for data, an engine that retrieves the requested data, and a response spooler that spools the retrieved data to a session state stored in a repository, and replicates the session state to at least one additional database server, the replicated session state enabling the at least one additional database server to respond to the command if the first session fails; and the first database server transmits the data to the client in response to the command.

In an embodiment, wherein if the first session fails, the session manager establishes a second session with the client and receives a re-transmission of the command from the client; the requested data is accessed in the session state stored in the repository; and the first database server transmits the requested data to the client in response to the retransmitted command.

In an embodiment, the session manager receives a session identifier from the client that identifies the first session, and the response spooler stores the received session identifier in the session state in the repository; and the session manager receives the session identifier from the client in a communication transmitted to the first database server after the first session fails, determines that the session identifier received in the communication matches the session identifier stored in the session state, and resultantly enables the second session to be established.

In an embodiment, wherein if the first session fails, the session manager establishes a second session with the client and receives a re-transmission of the command from the client that includes an indication of a portion of the requested data that was already received by the client; and the first database server transmits to the client the data included in the session state stored in the repository other than the indicated portion in response to the retransmitted command.

In an embodiment, the portion of the requested data that was received by the client is indicated as at least one row or at least one data packet received by the client.

In an embodiment, the first session is established with the client to perform an SQL (structured query language) SELECT query for an application associated with the client.

In an embodiment, the system further comprises: a second database server that includes a remote replicated session state handler that receives the replicated session state from the first database server, the replicated session state including a session identifier, a command identifier, and the data, and a second session manager that receives a request from the client to establish a second session with the client due to the first session having failed, determines that a session identifier included in the request matches the session identifier included in the replicated session state, establishes the second session with the client at the second database server, receives a retransmission of the command from the client, and determines that the command identifier included in the replicated session state matches a command identifier received with the retransmitted command; and the second database server transmits the data to the client in response to the retransmitted command.

In an embodiment, the second command indicates at least one row or at least one data packet received by the client from the first database server; and the second database server transmits to the client the data included in the replicated session state other than the indicated at least one row or at least one data packet in response to the retransmitted command.

VI. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method in a database server, comprising:
establishing a first session with a client to handle a database query for the client;
receiving a request for data associated with the first session from the client;
retrieving the requested data;
spooling the requested data to a first session state stored in a repository that is accessible to the database server by communications with at least one computing device, the at least one computing device controlling access to a plurality of session states stored in the repository including the first session state, the stored session states corresponding to a plurality of sessions between a plurality of clients and a plurality of database servers, the at least one computing device configured to enable the sessions to be reestablished, including enabling each session to be reestablished between a corresponding client and a corresponding database server by accessing corresponding data of corresponding stored session state in the repository and transmitting the accessed data in response to a message containing a corresponding session identifier received from the corresponding database server; and
transmitting the requested data to the client in response to the request.

2. The method of claim 1, further comprising:
undergoing a failure in the first session due to a failure in a connection between the client and the database server during the first session or due to a failure in the database server.

3. The method of claim 1, wherein if the first session fails, performing:
establishing a second session with the client;
receiving a re-transmission of a command from the client;
accessing the requested data in the session state stored in the repository via the at least one computing device; and
transmitting the requested data to the client in response to the retransmitted command.

4. The method of claim 3, wherein said establishing a first session with a client to handle a database query for the client comprises:

storing a session identifier in the first session state in the repository; and
said establishing a second session with the client comprises:
receiving the session identifier from the client in a communication transmitted to the database server to establish the second session, and
determining that the session identifier received in the communication matches the session identifier stored in the session state.

5. The method of claim 1, wherein if the first session fails, performing:
establishing a second session with the client;
receiving a re-transmission of a command from the client with an indication of a portion of the requested data that was received by the client; and
transmitting to the client the data included in the first session state other than the indicated portion.

6. The method of claim 5, wherein said receiving a re-transmission of the command from the client with an indication of a portion of the requested data that was received by the client comprises:
receiving an indication of at least one row or at least one data packet received by the client.

7. A method in a database server, comprising:
establishing a first session with a client to handle a database query for the client;
receiving a request for data associated with the first session from the client;
retrieving the requested data;
spooling the data to a session state stored in a repository that is accessible to the database server by communications with at least one computing device, the at least one computing device controlling access to the session state in the repository;
transmitting the data to the client in response to the request; and
receiving a replicated session state from a second database server that is a copy of a session state generated at the second database server to handle a database query for a second client, the replicated session state including a session identifier, a command identifier, and data retrieved from a database at the second database server.

8. A method in a database server, comprising:
establishing a first session with a client to handle a database query for the client;
receiving a request for data associated with the first session from the client;
retrieving the requested data;
spooling the data to a session state stored in a repository that is accessible to the database server by communications with at least one computing device, the at least one computing device controlling access to the session state in the repository;
transmitting the data to the client in response to the request;
accessing a second session state in the repository through the at least one computing device, the second session state provided to the repository by a second database server that is a copy of a session state generated at the second database server to handle a database query for a second client, the second session state including a session identifier, a command identifier, and data retrieved from a database at the second database server; and
establishing a second session with the second client based on the second session state to complete the database query for the second client.

9. The method of claim 8, wherein the repository is a shared repository configured to store session states corresponding to a plurality of sessions, the session states accessible via the at least one computing device by a plurality of database servers to enable the database servers to respond to requests associated failed sessions of the plurality of sessions.

10. A system, comprising:
a first computing device that includes
at least one processor circuit; and
at least one memory that stores program code configured to be executed by the at least one processor circuit, the program code comprising:
first instructions that, upon execution by the at least one processor circuit, control the first computing device to establish a first session with a client to handle a query for the client;
second instructions that, upon execution by the at least one processor circuit, control the first computing device to retrieve requested data; and
third instructions that, upon execution by the at least one processor circuit, control the first computing device to spool the retrieved data to a first session state stored in a repository that is accessible to the first computing device by communications with one or more computers, the one or more computers controlling access to a plurality of session states stored in the repository including the first session state, the stored session states corresponding to a plurality of sessions between a plurality of clients and a plurality of computing devices, the one or more computers configured to enable the sessions to be reestablished, including enabling each session to be reestablished between a corresponding client and a corresponding computing device by accessing corresponding data of a corresponding stored session state in the repository and transmitting the accessed data in response to a message containing a corresponding session identifier received from the corresponding computing device; and
the first computing device configured to transmit the retrieved data to the client in response to the request.

11. The system of claim 10, wherein if the first session fails, the first instructions, upon execution by the at least one processor circuit, control the first computing device to establish a second session with the client and receive a re-transmission of the command from the client;
the second instructions, upon execution by the at least one processor circuit, control the first computing device to access, via the one or more computers, the requested data in the first session state stored in the repository; and
the first computing device configured to transmit the requested data to the client in response to the retransmitted command.

12. The system of claim 11, wherein the third instructions, upon execution by the at least one processor circuit, control the first computing device to store a received session identifier in the first session state in the repository; and
the first instructions, upon execution by the at least one processor circuit, control the first computing device to receive the session identifier from the client in a communication transmitted to the first computing device after the first session fails, determine that the session identifier received in the communication matches the session identifier stored in the first session state, and resultantly enable the second session to be established.

13. The system of claim 10, wherein if the first session fails, the first instructions, upon execution by the at least one processor circuit, control the first computing device to establish a second session with the client and receive a re-transmission of the command from the client that includes an indication of a portion of the requested data that was already received by the client; and
the first computing device is configured to transmit to the client the data included in the first session state stored in the repository other than the indicated portion in response to the retransmitted command.

14. The system of claim 13, wherein the portion of the requested data received by the client is indicated as at least one row or at least one data packet received by the client.

15. The system of claim 10, the program code further comprising:
fourth instructions that, upon execution by the at least one processor circuit, control the first computing device to receive a replicated session state from a second computing device that is a copy of a session state generated at the second computing device to handle a query for a second client, the replicated session state including a session identifier, a command identifier, and data retrieved from the second computing device.

16. A system, comprising:
a first computing device that includes
at least one processor circuit; and
at least one memory that stores program code configured to be executed by the at least one processor circuit, the program code comprising:
first instructions that, upon execution by the at least one processor circuit, control the first computing device to establish a first session with a client to handle a query for the client;
second instructions that, upon execution by the at least one processor circuit, control the first computing device to retrieve requested data; and
third instructions that, upon execution by the at least one processor circuit, control the first computing device to spool the retrieved data to a session state stored in a repository that is accessible to the first computing device by communications with one or more computing devices, the one or more computing devices controlling access to the session state in the repository; and
a second computing device that includes
fourth instructions stored in a memory that, upon execution by one or more processor circuits of the second computing device, control the first computing device to access the session state from the repository via the one or more computing devices, the session state including the identifier, a command identifier, and the data, and
fifth instructions stored in a memory that, upon execution by the one or more processor circuits of the second computing device, control the first computing device to receive a request from the client to establish a second session with the client due to the first session having failed, determine that a session identifier included in the request matches the identifier included in the session state, establish the second session with the client at the second computing device, receive a retransmission of the command from the client, and determine that the command identifier included in the session state matches a command identifier received with the retransmitted command; and the second computing device transmits the data to the client in response to the retransmitted command.

17. The system of claim 16, wherein the second command indicates at least one row or at least one data packet received by the client from the first computing device; and the second computing device transmits to the client the data included in the session state other than the indicated at least one row or at least one data packet in response to the retransmitted command.

18. The system of claim 10, wherein the second instructions, upon execution by the at least one processor circuit, control the first computing device to access a second session state in the repository through the one or more computers, the second session state provided to the repository by a second computing device that is a copy of a session state generated at the second computing device to handle a query for a second client, the second session state including a session identifier, a command identifier, and data retrieved from the second computing device; and wherein the first instructions, upon execution by the at least one processor circuit, control the first computing device to establish a second session with the second client based on the second session state to complete the query for the second client.

19. The system of claim 10, wherein the repository is a shared repository configured to store session states corresponding to a plurality of sessions, the session states accessible via the one or more computers by a plurality of computing devices to enable the computing devices to respond to requests associated failed sessions of the plurality of sessions.

20. A method in a first computing device, comprising:

accessing, via one or more computing devices, a shared session state stored by a second computing device in a repository, the session state having been generated by the second computing device to handle a query for a client, the session state including a session identifier, a command identifier, and data retrieved in response to the query;

receiving a request at the first computing device from a client to establish a session with the client due to a failure in a first session established between the client and the second computing device;

determining that a session identifier included in the request matches the session identifier included in the session state;

establishing a second session with the client at the first computing device;

receiving a command associated with the second session from the client;

determining that the command identifier included in the session state matches a command identifier received with the command; and transmitting the data from the first computing device to the client in response to the command.

* * * * *